United States Patent [19]

Barto

[11] Patent Number: 5,289,880

[45] Date of Patent: Mar. 1, 1994

[54] TOWABLE ROAD TENDER

[76] Inventor: Rollin V. Barto, 22A Montgomery Rd., Windham, Me. 04062

[21] Appl. No.: 892,569

[22] Filed: Jun. 3, 1992

[51] Int. Cl.⁵ .............................................. E02F 3/76
[52] U.S. Cl. ................................ 172/799.5; 172/328; 172/319; 172/484; 172/677; 172/684.5
[58] Field of Search ................... 172/799.5, 684.5, 780, 172/318, 319, 328, 484, 417, 680, 776, 677

[56] References Cited

U.S. PATENT DOCUMENTS

| | | |
|---|---|---|
| 2,004,846 | 6/1935 | Allison et al. |
| 2,635,888 | 4/1953 | Bailiff . |
| 2,866,281 | 12/1958 | Breaux . |
| 3,266,181 | 8/1966 | Olafson ........................ 172/799.5 |
| 3,716,105 | 2/1973 | Hallam . |
| 4,373,591 | 2/1983 | Schaaf et al. ................. 172/328 |
| 4,396,069 | 8/1983 | Ferber et al. ................. 172/484 |
| 4,492,272 | 1/1985 | Jensen ........................... 172/328 |
| 4,606,413 | 8/1986 | Hake .............................. 172/328 |
| 4,700,786 | 10/1987 | Berry ............................. 172/799.5 |
| 4,898,247 | 2/1990 | Springfield .................... 172/799.5 |

FOREIGN PATENT DOCUMENTS 2388475  12/1978  France .

OTHER PUBLICATIONS

"Everson Automatic Grade Plane", Oct. 1979.
The York Company-Product description of a York rake.

Primary Examiner—Randolph A. Reese
Assistant Examiner—Spencer Warnick
Attorney, Agent, or Firm—Thomas L. Bohan; Chris A. Caseiro

[57] ABSTRACT

A towable road tender device for grading unpaved roadway surfaces. The tender device may be hitched to commercial vehicles but is particularly suited for use with private vehicles, such as small tractors and pickup trucks. A set of relatively lightweight frames reduce the weight to be pulled by the vehicle. The towable road tender device is sized to be operated using small-scale power take-off units commonly available in private vehicles, such as, for example, the power units of conventional front-end plows. The set of lightweight frames includes a support frame that secures the tending tool, a wheel frame that pivots the rear towing wheels either toward or away from the support frame, and an attachment frame joining the other two frames to a hitch on the towing vehicle. The attachment frame is designed to keep the support frame parallel to the plane of the underlying roadway surface as that support frame is raised or lowered. The height differential between the hitch of the towing vehicle and the support frame normally results in a lifting of the front of the support frame and a reduction in the bearing weight of the tending tool on the roadway surface. The attachment frame of the present invention eliminates this problem by pivoting upward when the tending tool is lowered down to the roadway surface. This pivoting not only eliminates the lifting, it enhances the bearing capacity of that tool.

10 Claims, 3 Drawing Sheets

TOWABLE ROAD TENDER

BACKGROUND OF THE INVENTION

1. Field of the Invention

The present invention relates to a towable device that may be used to scrape and grade unpaved surfaces such as roadways and the like. More particularly, the present invention relates to a towable road tender (1) that is relatively lightweight; (2) that is readily useable behind small, private tractors and pickup trucks as well as with larger commercial vehicles; (3) that may be operated via convenient small-scale power take-off units, such as the hydraulic units of conventional front-end plow devices; and (4) that may be either centered directly behind the vehicle or set off to one side behind the vehicle. The preferred embodiment of the present towable road tender includes a lightweight frame, a set of pivotable rear wheels, an articulated attachment frame and a pivotable grading blade.

2. Description of the Prior Art

Road grading devices have been available for many years. Many types of road graders are used to complete the restructuring of rough terrain after preliminary smoothing initiated by heavy equipment such as bulldozers. This finish grading yields roadways that may or may not be paved. In most instances, commercially available road graders are of substantial size and weight and provide uniform, smooth leveling. Generally, these graders are single-unit devices that comprise a grading blade positioned under the vehicle operator, and the blade alone is powered upward or downward in order to contact the underlying surface.

Alternatively, there are grading devices that can be drawn behind powered vehicles instead of being made an integral component of such vehicles. These graders can therefore be shifted from one vehicle to another for greater operational flexibility. One example of such grading devices is the land leveler disclosed by Breaux in U.S. Pat. No. 2,866,281 (1958). Breaux describes a grading blade that is affixed to a combination frame which is in turn used to pivot the blade. Another example is the leveling apparatus described by Bailiff in U.S. Pat. No. 2,635,888 (1953). The Bailiff device is a wheeled assembly for a towed grader. The assembly provides for hydraulic operation of the lower portion of a jointed frame that raises and lowers the leveling blade by drawing in or extending the rear wheels. The upper portion of the frame is intended to be used as a trailer unit for transporting materials. The Hallam (U.S. Pat. No. 3,716,105—1973) towable grader highlights the usage of a particular coupling unit that permits the tractor towing the grader to turn in a relatively tight radius. All of the above-referenced disclosures fail, however, to provide a towed grader that may be oriented off-center, or offset, behind the towing vehicle. Such a design would permit the user to drive the towing vehicle safely on the roadway while leveling more precarious positions along the roadway edge without compromising the ability to turn in a tight radius when required.

The above-described towable grading devices, and others like them, provide a means for preparing roadway surfaces without resort to very expensive self-powered machinery. Nevertheless, even these towable devices exclude the typical private user from improving his or her own roadway, driveway and the like. In particular, the towable graders presently available are designed to be pulled behind a piece of heavy-duty equipment, such as an earth mover or commercial tractor, that is capable of moving and maneuvering an object weighing several thousand pounds, which object is often dragging an additional load of roadway dirt. The private user does not have ready access to such equipment and even with such access may not be capable of operating it. More commonly, the private user has a vehicle such as a pickup truck or small-scale tractor, acquired in order to complete common everyday projects. Such vehicles cannot be used to tow the prior art graders described—particularly when such graders are pulling additional loads during a leveling operation. Therefore, the prior art towable graders are not designed for the private user.

Another indication that most prior art graders are commercially oriented is the means by which they are operated. A number of them are operated hydraulically via lines extending from the towing vehicle. (See, for example, the dual-action hydraulic operation of the Bailiff wheel assembly.) The size of the prior towable graders at issue require a reservoir of several gallons of hydraulic fluid for proper operation. The heavy-duty towing equipment previously noted may be able to provide such capacity. At the very least, that equipment is designed to accommodate such additional capacity and to control the operation of hydraulically-powered graders from within the towing vehicle. On the other hand, the vehicles normally employed by the private user cannot readily accommodate such a supplemental reservoir of hydraulic fluid. Instead, such private vehicles would have to be modified considerably in order to provide for proper operation of the prior towable graders—assuming, of course, that such private vehicles had the physical capacity to haul them. That modification would drive up the overall cost of the grader and would probably compromise operation of the vehicle when the grader was not in use. Moreover, further modification would have to be carried out if the grader were to be operated remotely from the towing vehicle itself, an action that would further increase costs. Alternatively, a more suitable towed grader would be operable via systems readily available for private vehicles, such as, for example, the hydraulic units of front-end plowing devices.

There are available towable devices that may be used to "manicure" a roadway. These devices often comprise a screening rake that essentially scrapes loose material from the roadway and that may create small troughs in the roadway as well. These devices necessarily fail to fulfill the goal achieved with the prior art graders and levelers in that they are too lightweight to remove the top, rough layer of the roadway and then deposit the excess material where it may be lacking. The relatively small size of such screening devices allows for usage behind private towing vehicles of the type previously noted. This does not, however, overcome their inherent inability to restructure a roadway. In the scheme of things, such towable "screens" are at the opposite end of the spectrum from the heavy-duty towable graders noted.

There are devices available that might be considered suitable for use as tenders towable behind private vehicles. Typically, these devices are rake systems used for roadway screening. In some instances a grading blade may be affixed to the rake element and used in an attempt to level the roadway. These devices, even with attachable grader blades suffer from the fact that they weigh much less than the prior towable graders. Because of this weight reduction, the supplemental grading blade does not have the forcing load to "dig up" an old roadway in order to produce a level new surface. At best, only loosely-packed portions of the roadway can be drawn by the blade. In most instances, however, the blade simply bounces over hardened roadway sections. As a result, the roadway may become even less level than before use of the lightweight grading blade. Apart from this essential problem with small, towable rake systems, there are other problems which make them less than suitable for adequate road grading. In particular, these devices apparently have no means for 1) quickly and easily raising and lowering the blade when desired; 2) canting the blade to grade at an angle; and 3) offsetting the blade of the rake system to provide for leveling of precarious roadway edges.

One critical drawback that is evident in all of the earlier towable grading systems noted above is the means by which the towed device is connected to the towing vehicle. Specifically, many of the towable systems comprise elaborate connection devices which increase complexity as well as cost. For the private user, the goal is to minimize cost and reduce complexity. For that reason, it is most advantageous to use connection means that are already available on the towing vehicle. Generally, these means are either hitching balls or towing hooks. There are towable graders/screens that provide for ready connection to the towing vehicle in the manner noted. They all fail, however, to address the fact that when the grader is connected to the towing vehicle, the connection results in some cases a serious, and, in other cases, a slight, lifting of the grader unit from the roadway. This lifting is particularly pronounced when the towing vehicle is a pickup truck and the grader is considerably shorter than the rear of the truck. In this lifted position the blade's bearing on the roadway is reduced and so its leveling effectiveness is also reduced. The most common reason for this failure is the fact that the connecting bar between the hitch of the towing vehicle and the frame comprising the grading blade together form a unitary, straight piece. Because of this there is no means for counteracting the lifting effect of the connection. (See, for example, the attachment means of the Bailiff assembly and the more complex Hallam device.) If anything, this design requires, at the very least, a heavier grader frame in order to permit adequate road grading. A heavier frame may not be suitable for use behind the smaller private vehicles contemplated. Thus, both simple and complex towable grading devices have failed to eliminate this undesirable lifting in a relatively simple grader design.

Some attempts to minimize lifting effects have yielded fairly complex systems. In particular, the Breaux leveler includes an elaborate hydraulic system for raising and lowering the front end of the grader frame. This elaborate system does not, however, achieve the desired goal because there is no means for securing the articulated front arm to the towing hitch. Instead, a simple hook is used to complete the connection. As the articulated joint of the frame is pivoted, the attachment hook simply rotates on the towing hook. This may or may not eliminate the upward lifting effect entirely. In any event, the complex Breaux attachment fixture does not take advantage of the towing vehicle's weight as a way of translating supplemental vertical loading force to the grading blade.

A more effective road-tending device would be one of relatively light weight so that the towing load on the towing vehicle would be minimized. At the same time, the device would take advantage of the towing vehicle's own weight in order to provide a bearing load to the grading blade. Prior single-unit graders had such an advantage, primarily because the grading blade was an integral part of the moving vehicle. On the other hand, towable tenders do not have this luxury and are necessarily a compromise between towing weight and leveling capability. The prior art towable graders have failed to effectively achieve this compromise, however, particularly with regard to graders usable behind common private vehicles. Therefore, what is needed is a towable road grader (tender) that may be readily deployed behind small private vehicles such as pickup trucks. What is also needed is a towable road tender that is lightweight and that takes advantage of the towing vehicle's weight to provide bearing load to the tending tool. Further, what is needed is a towable tender that may be pulled either centered directly behind the towing vehicle or offset from center. Still further, what is needed is a towable tender that may be operated using power systems readily available for private vehicles, such as, for example, those hydraulic units provided with conventional front-end plow devices.

SUMMARY OF THE INVENTION

It is an object of the present invention to provide a relatively lightweight, towable road-tending device that may be readily and easily used behind small vehicles such as private tractors and pickup trucks. It is another object of the present invention to provide a towable road tender that has connecting means (between the tender and the towing vehicle) which does not create an inherent lifting (an elevating) of the tending blade, wherein the connection means takes advantage of the towing vehicle's weight in order to supplement the bearing load on that tending blade. It is still another object of the present invention to provide a towable road tender that may be drawn, centered, directly behind the towing vehicle, or that, alternatively, may be drawn to one side behind the towing vehicle in order to grade difficult-to-reach roadway edges. It is yet another object of the present invention to provide a relatively lightweight, towable road-tending device that may be manipulated by means located directly on the device, or remotely from the towing vehicle using any of the remote manipulation systems that are readily available for private vehicles. These and other objects of the present invention will become readily apparent upon consideration of the following summary, the figures, and the detailed description of the preferred embodiment of the invention.

The above-listed objectives are achieved through the design of the present invention, which is directed to a towable road tender that includes a lightweight support frame to which is affixed the road tending tool—generally a grader blade. Also connected to the support frame is a set of rear wheels that support a portion of the tender's weight and that enable the user to tow the tender when it is not in use. These rear wheels are attached to a wheel frame that is pivoted about the rear portion of the support frame when the tending tool is in use in such a way to allow the rear wheels to simply rest on the roadway partially decoupled from the tending tool which—resting on the roadway—then supports most of the device's weight. In order to avoid any reduction in the tending tool's bearing load, the present invention includes a simple articulated attachment frame that connects the support frame of the tender to the arm linking the towable tender to the towing vehicle. This articulated attachment frame not only prevents the attachment arm from lifting the tending tool from the roadway, it also enhances the tending tool's ability to dig into the underlying roadway by forcing the front of the support frame downward. As a result, the tending tool is more inclined to dig into the roadway surface rather than bounce over it. In addition, the articulated attachment frame provides lift at the front of the support frame when the tending tool is to be removed from the underlying surface. Providing lift at both the rear and the front of the support frame reduces the length of that support frame which would otherwise be required to remove the tending tool from the underlying surface. As a result, the support frame weights much less, leading to a lightweight road tender. Supplemental features of the present invention include powering means to pivot the wheel frame and to cant the tending tool to the left or right as desired, and means for towing the tender behind the towing vehicle under control while the tender is set off to one side or the other of center.

The lightweight support frame of the towable road tender of the present invention may be formed of any of a variety of commercially available components. The only role of this frame is to provide a structure to which the tending tool can be connected and upon which desired manipulation devices can rest. The support frame must also be capable of withstanding the stress and shock to be expected both when the tender is towed from one location to another and when the tending tool is in use. The most inexpensive material suitable to use to form the support frame is mild-weld steel. Alternatively, aluminum may be used and, perhaps, some types of plastics and reinforced plastics for at least portions of the frame. Since the road tender operates entirely out-of-doors, the support frame must be protected from corrosive environmental effects. In order to enhance the lightweight characteristics of the entire device, the support frame may be formed of any type of corrosion-resistant component that will provide the desired minimal support at minimal weight. For this reason, metal angles, channel, piping and tubing have been used in various combinations.

The tending tool may be affixed permanently to the support frame by welding it to a swivelable fixture, or it may be detachably connected by bolts and the like. When detachably affixed, the tending tool can be attached to the support frame via a swivelable fixture or it can be connected directly to the support frame using means that permit it to swivel, or cant, as desired. The tending tool can be any type of device that is sufficiently large enough, wide enough and heavy enough to level or grade the roadway to the degree desired. Any number of commercially-available components may be used to form the tending tool, provided the selected tool can withstand the type of wear and stress reasonably expected for the conditions of use. Even commercially-available grader blades may be attached to the support frame of the present invention. Additionally, the tending tool may be spring-loaded, or shock-mounted, to the support frame in order to minimize shock damage from a rough roadway.

The rear wheels of the present invention act primarily to support the rear portion of the weight of the towable road tender as it is being towed to a particular location. The wheels are connected to a wheel frame and may include pneumatic tires or other suitable mountings. When the tender is in position to be towed, the rear wheels are maneuvered to lift the tending tool away from the road surface. This is achieved by positioning the wheels near the rear portion of the support frame. When the tender is in use, the wheels are maneuvered to extend beyond the end of the support frame. When the rear wheels are extended in this manner the device becomes "splayed" and its overall height is reduced to the point that the bottom of the tending tool comes into contact with the road surface. In this position the wheels simply act as a balance and a means of keeping the rear of the support frame from dragging on the ground. The wheels may operate independently when the tender is in use, and they may be locked together during trailering of the device.

The key to the usefulness of the rear wheel assembly of the present invention is the wheel frame. The wheel frame is pivotally connected to the support frame and to a pivoting means, such as a hydraulic cylinder for example. In operation, the pivoting means moves the wheel frame so that the wheels extend rearward away from the support frame, thereby lowering the entire tender device toward the underlying surface. This acts to lower the grader blade, or the equivalent, to the road surface. It also reduces the loading on the wheels. When the road preparation is completed, the pivoting means moves the wheel frame so that the rear wheels are positioned closer to, and more directly under, the support frame, thereby transferring a significant portion of the tender's weight from the lifted tending tool to the wheels. When the tending tool has been lifted well off the underlying surface, the road tender is in order to be easily towed to another location.

Another significant feature of the present invention is the attachment frame used to connect the support frame to an attachment device. The attachment device is, in turn, directly affixable to the towing vehicle. As previously noted, a major drawback of the prior art towable graders arises from the attachment of the grader to the towing vehicle. The present attachment frame overcomes this drawback by providing an easy way of securing the towed device to the towing vehicle while not only eliminating the lift to the tending tool caused by such attachment, but also enhancing the digging capability of the tending tool. In most instances of the prior art, the attachment point on the towing device is significantly higher than the support frame for the tending tool. This height differential results in a lifting of the tool when the frame including the tool is affixed to the vehicle's attachment point. The attachment frame of the present invention eliminates this problem by being pivotally connected to the support frame in a way which permits the support frame to remain essentially parallel to the plane of underlying roadway surface when it (and tending tool) is lowered to that surface. When the support frame is raised, it remains parallel to the plane of the surface below while the angle of the plane formed by the attachment frame varies up and down as a function of the movement of the support frame. In the preferred embodiment of the invention this attachment frame includes two sets of articulating legs that lift the attachment device upward and downward as the support frame moves downward and upward. As with the other two frames, the attachment frame may be formed of any suitable commercially-available materials.

A supplemental feature of the present invention enhancing its usefulness is a pair of offset connectors which, when connected from the support frame to the towing vehicle, enable the user to pull the road tender device behind the vehicle but off center from the axis of the towing vehicle, i.e., offset from the attachment point on that vehicle. These offset connectors, which in the preferred embodiment of the present invention are movable chains linked to the towing vehicle, retain the road tender behind the vehicle at a position different from that available through the use of a permanent attachment point located at the center of the rear of the vehicle. Another alternative feature making the present invention more effective is its capacity to utilize a private towing vehicle's own control systems to manipulate the road tender. Specifically, the design of the present tender is such that very little force is required to maneuver all of the movable components, unlike the larger prior art towable graders which require considerable power to be operated. While all systems may be operated manually, at least when they are manipulated directly at the road tender, the present tender is also designed to operate using the power available in private vehicles, particularly those with front-end plows and the like. Through a simple hydraulic line connection, the pivot mechanism of the wheel frame can be manipulated using a front-end plow system. Additionally, the same hydraulic system can be used to manipulate the tending tool. Alternatively, the electrical system of such a private vehicle is sufficient to operate a swivel device if that is used instead of hydraulics in order to cant the tending tool.

The low energy requirements of the present invention lend its usefulness to private individuals who do not have the need for the large-scale commercial devices presently on the market. For this reason and the other benefits previously noted, the road tender of the present invention overcomes the deficiencies of the prior art graders. The road tender described herein is ideally suited for use with private vehicles in that it is lightweight and does not require considerable supplemental energy to operate. Additionally, it takes advantage of the towing vehicle's weight to provide a means for achieving the road-grading quality associated with a commercial vehicle without all of the associated costs and problems. It thus provides an easy and effective means for an individual to grade a roadway or the like without running into the considerable expense and complexity associated with commercial devices.

DETAILED DESCRIPTION OF THE PREFERRED EMBODIMENT

Figure 1:
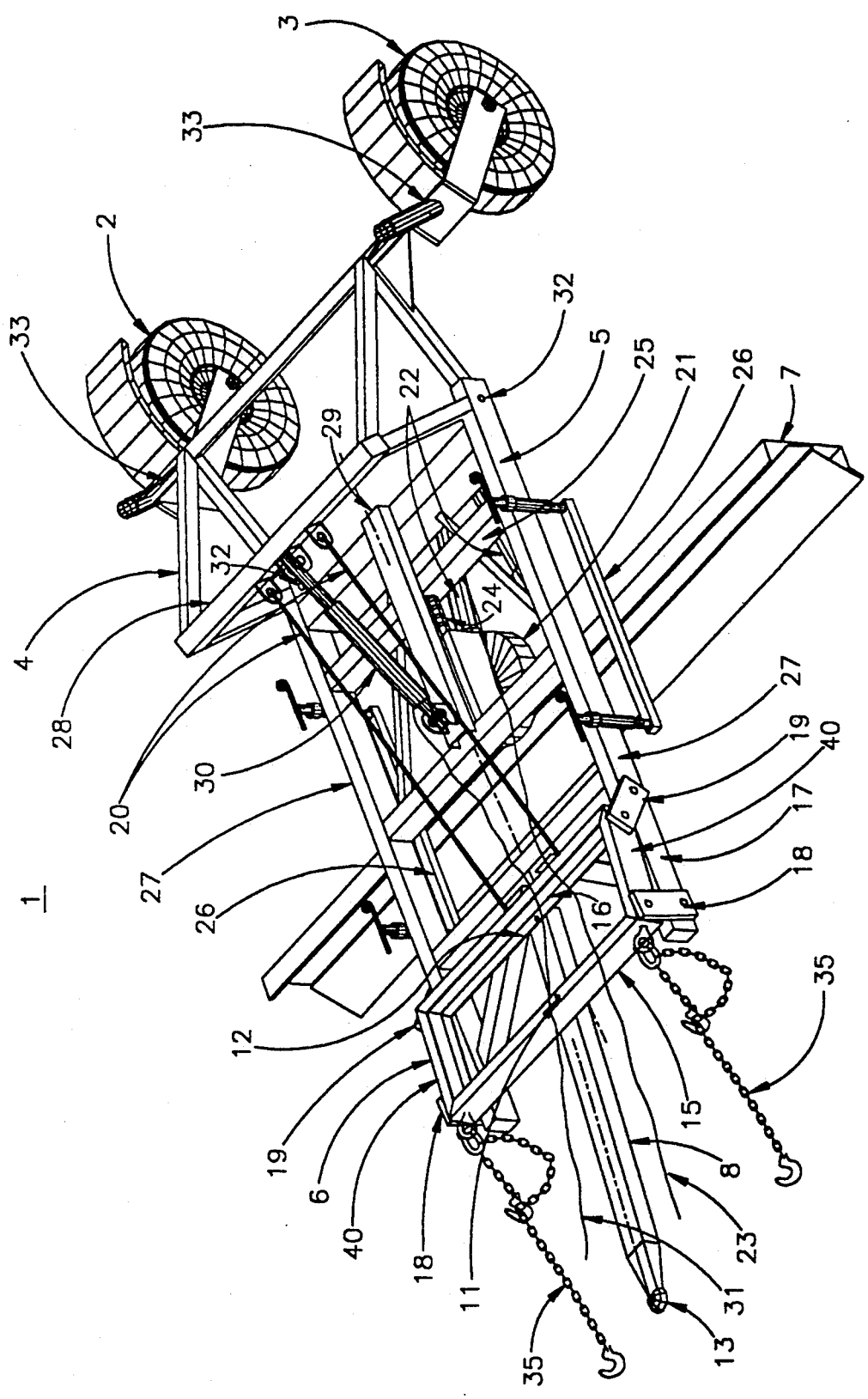
FIG. 1 is a perspective view of the towable road tender of the present invention.
Figure 2:
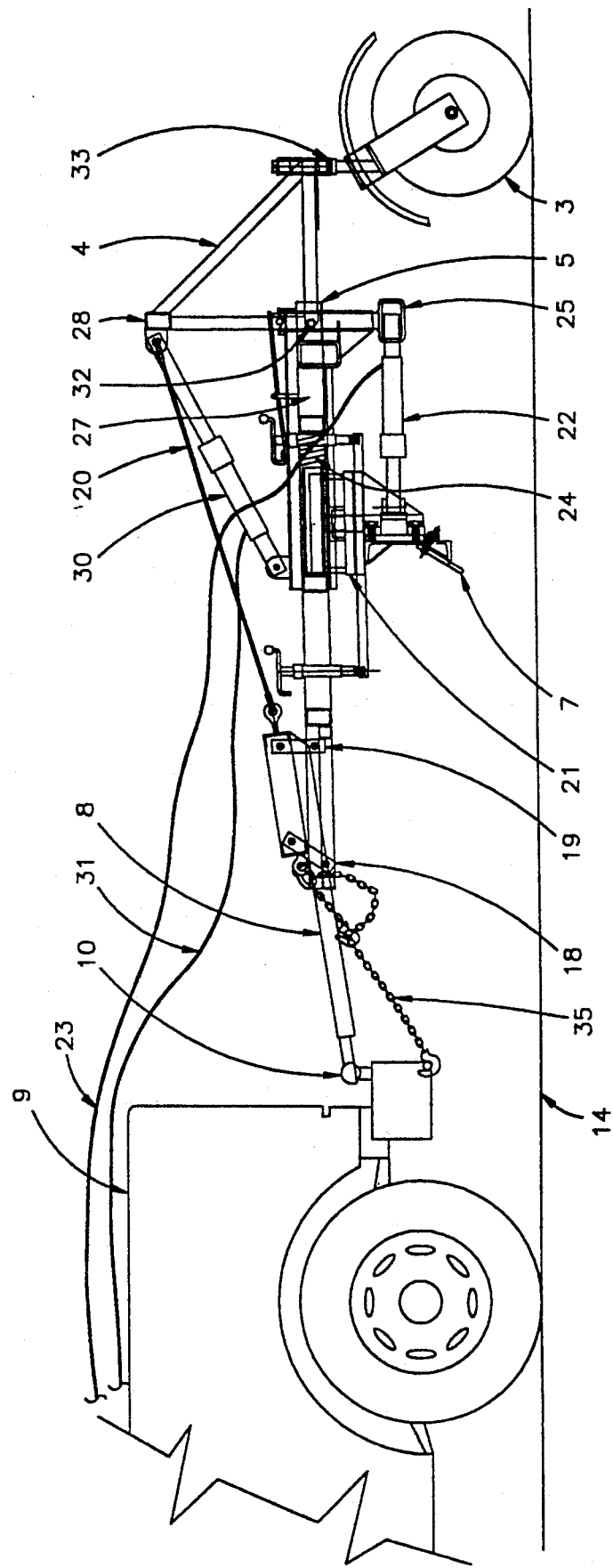
FIG. 2 is a side view of the towable road tender of the present invention in which the tender is in position for towing only.
Figure 3:
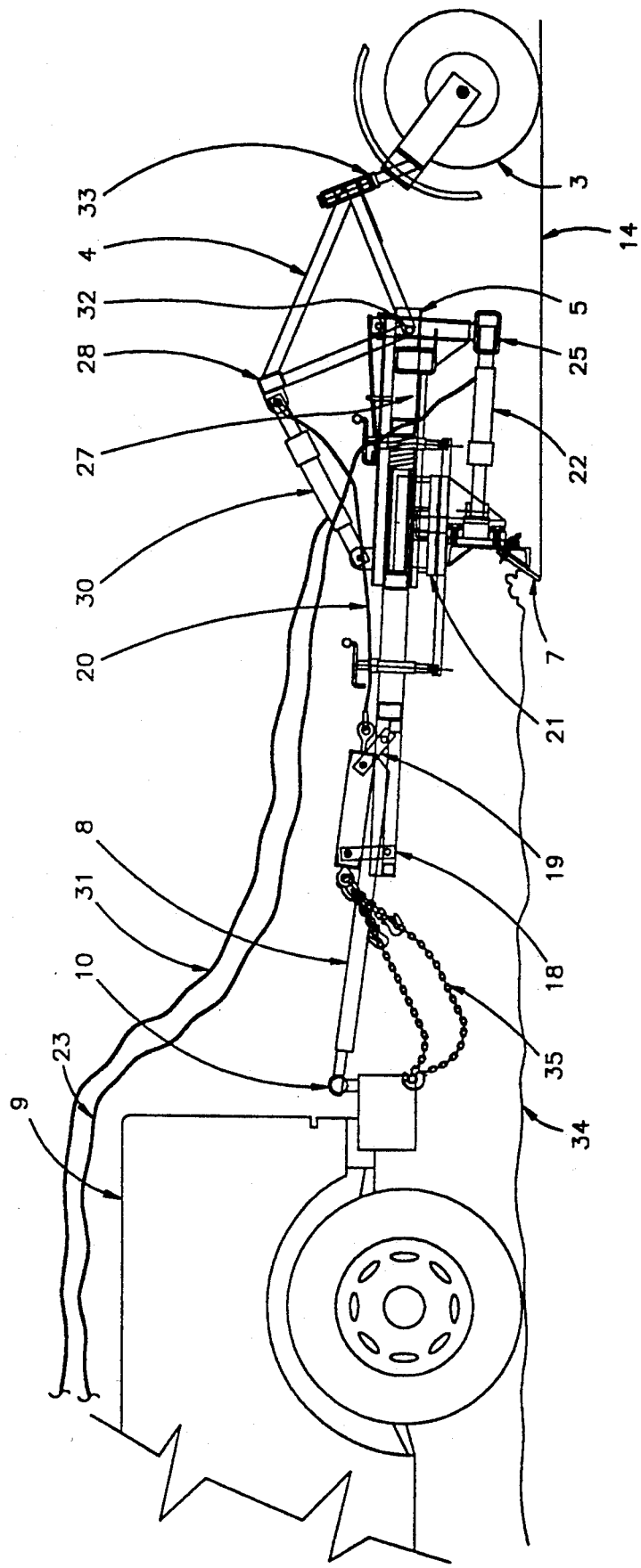
FIG. 3 is a side view of the towable road tender of the present invention in which the tender is in position for road tending only.

As illustrated in FIG. 1 of the drawings, a towable road tender 1 of the present invention includes a pair of laterally-spaced rear wheels 2 and 3, a wheel frame 4, a tool support frame 5, an articulated attachment frame 6, a tending tool 7, and an attachment arm 8. Said towable road tender 1 may be connected to a towing vehicle, such as a pickup truck 9 illustrated in FIGS. 2 and 3, by securing said attachment arm 8 to an attachment point on said pickup truck 9. The attachment point may be a towing hook, or, as illustrated in FIGS. 2 and 3, a hitching ball 10. Said towable tender 1 may be pulled by other types of powered vehicles, such as tractors, and is designed to be lightweight and reliably useable by private individuals.

A key feature of the present invention is said articulated attachment frame 6. In the preferred embodiment of said towable road tender 1, said attachment arm 8 is immovably connected to said articulated attachment frame 6 by bolts or the like at a first attachment arm pin 11 and a second attachment arm pin 12. A forward attachment arm position 13 comprises means for locking said attachment arm 8 to said hitching ball 10 of said pickup truck 9. Said articulated attachment frame 6 acts to pivot said attachment arm 8 about said hitching ball 10 when said tending tool 7 is raised from or lowered to an underlying road surface 14. Said first attachment arm pin 11 is located on a first attachment frame crossbar 15 and said second attachment arm pin 12 is located on a second attachment frame crossbar 16. Said first attachment frame crossbar 15 and said second attachment frame crossbar 16 are rotatably connected to a forward support frame section 17 of said support frame 5 by means of a forward pair of adjustable attachment frame connecting channels 18 and a rearward pair of adjustable attachment frame connecting channels 19. Said rearward pair of adjustable attachment frame connecting channels 19 are linked to each other by said second attachment frame crossbar 16 and are linked to said wheel frame 4 through said second attachment frame crossbar 16 by means of a pair of height adjustment cables 20. Said forward pair of adjustable attachment frame connecting channels 18 are connected to each other by way of said first attachment frame crossbar 15. Said forward pair of adjustable attachment frame connecting channels 18 are connected to said rearward pair of attachment frame connecting channels 19 via said attachment arm 8 and a pair of attachment frame side arms 40. In the preferred embodiment of the invention, all of the structural members are fabricated of mild-weld steel channel coated with a corrosion-resistant material. It is to be understood, however, that other suitable materials may be substituted therefor.

As indicated, said articulated attachment frame 6 is rotatably linked to said forward support frame section 17 by way of said forward adjustable attachment frame connecting channels 18 and said rearward pair of adjustable attachment frame connecting channels 19. This rotatable linkage permits said support frame 5 comprising said tending tool 7 to be lowered to said roadway surface 14 from behind said pickup truck 9 with said hitching ball 10 that, in spite of being substantially higher than said support frame 5 does not necessitate an upward lifting of said support frame 5. The primary function of said support frame 5 is to provide a retaining fixture for said tending tool 7. Preferably, said tending tool 7 is a grading blade fabricated of mild-weld steel that is swivably connected to said support frame 5 by means of a swivel mount 21. Said swivel mount 21 permits said tending tool 7 to be canted to the left or right as desired. In the preferred embodiment of said towable road tender 1, said tending tool 7 can be canted by means of a dual set of hydraulic tending tool cylinders and rams 22. Although other means of canting said tending tool 7 may be used, such as mechanical actuation, hydraulic operation lends itself to immediate applicability when power sources are already available on private towing vehicles, such as, for example, front-end snow plow power systems. In such a situation, and in the embodiment described herein, said hydraulic tending tool cylinders and rams 22 are linked to the vehicle's power source by tending tool hydraulic lines 23.

In order to minimize shock damage to said tending tool 7 while it is in use—and while said towable road tender 1 is being towed—a shock mount 24 may be affixed to said tending tool 7 and to an intermediate support frame crossbar 25. Optional adjustable rub rails 26 may be affixed to main support frame structures 27 and used to enhance the load bearing on said tending tool 7 while it is in use. As with said articulated attachment frame 8 said support frame 5 may be fabricated of any suitable materials. In the preferred embodiment of said towable road tender 1, said main support frame structures 27 of said support frame 8 are made of coated mild-weld steel channels. The remaining components are made of coated mild-weld steel angles, pipes and tubes.

The final main component of said towable road tender 1 is said wheel frame 4. As illustrated in FIGS. 2 and 3, said wheel frame 4 is pivoted over the greatest distance as part of the operation of said towable road tender 1. In the preferred embodiment of the present invention, said wheel frame 4 is a simple truss frame made of a set of coated mild-weld steel tubes. It is to be understood however, that any number of configurations and types of materials can be used to form said wheel frame 4. An upper wheel frame crossbar 28 of said wheel frame 4 is linked to an upper support frame member 29 by means of a hydraulic wheel frame cylinder and ram 30 and to said rearward attachment frame crossbar 16 by means of said height adjustment cables 20. The hydraulic wheel frame cylinder and ram 30 and said height adjustment cables 20 comprise a pivot control mechanism. It is to be understood that, as with said hydraulic tending tool cylinders 22, said hydraulic wheel frame cylinder and ram 30, as illustrated in the preferred embodiment, is a convenient means of powering said wheel frame 4 up and down. Nevertheless, suitable alternatives may be employed with equal reliability.

In operation, when said hydraulic wheel frame cylinder and ram 30, powered by said pickup truck 9 via a wheel frame hydraulic line 31, is fully extended, said upper wheel frame crossbar 28 is forced upward and rearward. This force said rear wheels 2 and 3 in toward said support frame 5. This is achieved because lower forward wheel frame joints 32 are pivotally connected to said support frame 5 and said rear wheels 2 and 3 are swivably connected to said wheel frame 4 via lower rear wheel frame joints 33. When said hydraulic wheel frame cylinder and ram 30 is fully extended, said pair of height adjustment cables 20 are pulled taut and they pull said second attachment frame crossbar 16 rearward. When said second attachment frame crossbar 16 is drawn rearward, said forward adjustable attachment frame connecting channels 18 and said rearward adjustable attachment frame connecting channels 19 first pivot on said forward support frame location 17 to pull said attachment arm 8 upward. As said hydraulic wheel frame cylinder and ram 30 continues to extend said articulated attachment frame 6 locks into the towing position illustrated in FIG. 2. The combination of the upward motion of the locked attachment frame 6 and the inward movement of said rear wheels 2 and 3 act to lift said support frame 5 and, in turn, said tending tool 7. When said hydraulic wheel frame cylinder and ram 30 is fully extended, said towable road tender 1 is ready for easy towing to another road-tending location.

The above-described procedure illustrates the method by which the preferred embodiment of the present invention is designed to operate when it is to be towed. When said towable road tender 1 is to be used to tend, level, or grade a roadway surface, said hydraulic wheel frame cylinder and ram 30 is simply relaxed, causing said wheel frame 4 to pivot inward. The inward pivoting of said wheel frame 4 causes said rear wheels 2 and 3 to pivot away from said support frame 5. The relaxation of said hydraulic wheel frame cylinder and ram 30 and the inward, and downward pivoting of said upper wheel frame crossbar 28 results in a slackening of said pair of height adjustment cables 20 and the subsequent pivoting of said attachment frame 6 downward and toward said pickup truck 9. The pivoting of said attachment frame 6 and the outward movement of said rear wheels 2 and 3 lower said support frame 5 toward said underlying roadway surface 14 while keeping said support frame 5 parallel to the plane of said underlying roadway surface 14. When said hydraulic wheel frame cylinder and ram 30 is completely relaxed, said tending tool 7 contacts said roadway surface 14 and is in order to tend untended roadway sections 34, as illustrated in FIG. 3.

An additional feature of the present invention permits a user to tend roadway surfaces at or near a roadway edge without bringing said pickup truck too close to that roadway edge. In the preferred embodiment of said towable road tender 1 said towable road tender is connected to said towing vehicle 9 by securing said attachment arm 8 to chain attachment points on said towing vehicle 9. A pair of different lengths safety chains 35 is attached to the front ends of each of said main support frame structures 27, a chain each to the left side and right side of the attachment arm 8 respectively. Said safety chains 35 are linked to chain attachment points on a rear section of said pickup truck 9, the chain attachment points being those commonly found on vehicles used for towing trailers and the like. In order to position said tending tool 7 offset from the center axis of said pickup truck 9, said towable road tender 1 may be aligned in that desired position as said towable road tender 1 is in order to be towed, i.e., when said tending tool 7 is lifted off of said roadway surface 14. Said tending tool 7 is then lowered to said roadway surface 14 such that there is essentially no weight on said rear wheels 2 and 3. At that time, said safety chains 35 are connected tautly to two points on the rear of said pickup truck 9, effectively locking said towable road tender 1 in the offset position it was originally placed in. As a consequence of said road tender being placed off-center, and said safety chains 35 of unequal length being pulled taut, left and right side safety chains 35 are, respectively, under differing tension, and therefore pull said towable road tender 1 to one side. Hence, when said tending tool 7 is in use, said safety chains 35 act to stop said towable road tender 1 from becoming aligned directly behind said pickup truck 9. This retention-in-position is particularly effective when said rear wheels 2 and 3 are locked together so that they act in concert.

While the towable road tender of the present invention has been described and illustrated with reference to particular components and configurations, it is to be understood that alterations in specific materials of construction, frame design and component interfacing may be made without deviating from the basic attributes of the invention.

I claim:

1. A road tender device for tending a roadway surface, wherein said road tender device is towable behind a vehicle, said road tender device comprising:
   a. an attachment frame connected to an attachment arm having means to connect said attachment arm to a hitching device of said vehicle;
   b. a support frame having a front end and a rear end, said front end of said support frame connected to said attachment frame, said support frame having means to couple a tending tool to said support frame;
   c. a wheel frame having an upper wheel frame member, said wheel frame connected to said rear end of said support frame, said wheel frame comprising laterally-spaced rear wheels supporting said rear end of said support frame; and
   d. pivot means connecting said upper wheel frame member to said support frame and connecting said upper wheel frame member to said attachment frame, wherein said pivot means simultaneously pivots said attachment frame on said front end of said support frame and said wheel frame on said rear end of said support frame such that when said upper wheel frame member pivots away from said vehicle said attachment frame also pivots away from said vehicle, said pivot means further allowing said rear wheels to be drawn toward said support frame as said tending tool is raised from said roadway surface.

2. The road tender device as claimed in claim 1 wherein said vehicle comprises a power take-off unit, and wherein said pivoting mechanism is powered via said power take-off unit of said vehicle.

3. The road tender device as claimed in claim 2 wherein said power take-off unit is hydraulic and said pivoting mechanism of said road tender device is in part, a hydraulic cylinder and ram affixed to said support frame and to said wheel frame.

4. The road tender device as claimed in claim 3 wherein said hydraulic cylinder and ram of said road tender device is remotely operable from within said vehicle.

5. The road tender device as claimed in claim 1 further comprising offset connectors affixed to said front end of said support frame and connected to a rear section of said vehicle, wherein said offset connectors are used to lock said road tender device in a position off-center from the center axis of said vehicle.

6. The road tender device as claimed in claim 1 wherein said tending tool is swivably connected to a crossbar of said support frame.

7. The road tender device as claimed in claim 6 wherein said tending tool is a grader blade.

8. The road tender device as claimed in claim 7 wherein said support frame comprises a pair of hydraulic tending tool cylinders and rams, wherein said pair of hydraulic tending tool cylinders and rams operate to cant said grader blade to the left or to the right.

9. The road tender device as claimed in claim 1 wherein said attachment frame comprises an attachment arm connecting a pair of attachment frame crossbars to said hitching device of said vehicle.

10. A road tender device for tending a roadway surface, wherein said road tender device is towable behind a vehicle, said road tender device comprising:
   a. an attachment frame pivotally affixed to a hitching device of said vehicle, said attachment frame comprising an attachment arm linking a pair of attachment frame crossbars to said hitching device;
   b. a support frame pivotally connected to said attachment frame, said support frame having a front end and a rear end and comprising a grader blade for tending said roadway surface, wherein said grader blade is swivably connected to a support frame crossbar of said support frame, and wherein a pair of hydraulic tending tool cylinders and rams connected to said support frame operate to cant said grader blade to the left or to the right;
   c. a wheel frame having an upper wheel frame member, said wheel frame connected to said rear end of said support frame, said wheel frame comprising laterally-spaced rear wheels supporting said rear end of said support frame;
   d. wheel frame adjustment means having a wheel frame hydraulic cylinder and ram connecting said upper wheel frame member to said support frame, and height adjustment cables connecting said upper wheel frame member to said attachment frame, wherein said wheel frame adjustment means pivots said attachment frame on said front end of said support frame and said wheel frame on said rear end of said support frame such that when said upper wheel frame member pivots away from said vehicle said attachment frame also pivots away from said vehicle, said wheel frame adjustment means further allowing said rear wheels to be drawn toward said support frame as said tending tool is raised from said roadway surface, wherein said vehicle comprises a hydraulic power take-off unit, and wherein said hydraulic power take-off unit of said vehicle powers said wheel frame hydraulic cylinder and ram; and
   e. offset connectors affixed to said front end of said support frame and connected to a rear section of said vehicle, wherein said offset connectors lock said road tender device in a position off-center from the center axis of said vehicle.

* * * * *